(12) United States Patent
Block

(10) Patent No.: US 8,855,284 B2
(45) Date of Patent: Oct. 7, 2014

(54) ASSIGNMENT OF FULL ENTERPRISE IDENTITY TO AUDIO CONFERENCE BRIDGES FOR IMPROVED CONFERENCE SCHEDULING AND CALL-IN EXPERIENCE

(75) Inventor: Frederick Peter Block, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 810 days.

(21) Appl. No.: 12/570,925

(22) Filed: Sep. 30, 2009

(65) Prior Publication Data

US 2011/0075826 A1    Mar. 31, 2011

(51) Int. Cl.
*H04M 3/42* (2006.01)
*H04M 7/00* (2006.01)
*H04M 3/56* (2006.01)

(52) U.S. Cl.
CPC .................. *H04M 7/0054* (2013.01);
*H04M 3/565* (2013.01)
USPC ..................... 379/202.01; 379/158

(58) Field of Classification Search
USPC .............................. 370/260–271
See application file for complete search history.

(56) References Cited

U.S. PATENT DOCUMENTS

| | | | |
|---|---|---|---|
| 7,174,365 B1 * | 2/2007 | Even et al. ................... | 709/204 |
| 2002/0062348 A1 * | 5/2002 | Maehiro ....................... | 709/205 |
| 2006/0088152 A1 * | 4/2006 | Green et al. ............. | 379/202.01 |
| 2006/0187859 A1 | 8/2006 | Shaffer et al. | |
| 2007/0274492 A1 | 11/2007 | Baker et al. | |
| 2007/0280464 A1 * | 12/2007 | Hughes et al. ........... | 379/205.01 |
| 2008/0219426 A1 | 9/2008 | Lai | |
| 2008/0259824 A1 * | 10/2008 | Frankel ........................ | 370/260 |

OTHER PUBLICATIONS

U.S. Appl. No. 11/860,700, filed Sep. 25, 2007, Swartz.

* cited by examiner

*Primary Examiner* — Duc Nguyen
*Assistant Examiner* — Assad Mohammed
(74) *Attorney, Agent, or Firm* — Sheridan Ross P.C.

(57) ABSTRACT

Systems and methods can provide an identity to a conference bridge; the identity including an email address for the conference bridge. When two or more people desire to conduct a conference, a person creates an invitation to the conference. The invitation can be an email invitation from a calendar program that can be sent to the invitees. The invitation can be sent to the conference bridge using the email address for the conference bridge. The conference bridge may then receive a call from a caller for a conference. The conference bridge can extract a caller identifier from the call and determine an email associated with the caller. The conference bridge may then retrieve the invitation having the email. Then, the conference bridge can attach the caller to the conference associated with the invitation.

20 Claims, 10 Drawing Sheets

ASSIGNMENT OF FULL ENTERPRISE IDENTITY TO AUDIO CONFERENCE BRIDGES FOR IMPROVED CONFERENCE SCHEDULING AND CALL-IN EXPERIENCE

BACKGROUND

Generally, conferencing and collaboration systems use several mechanisms and methods to enable people to call in to participate in "conference calls." The conference "calls" can be audio-only or they may include video, white-boarding, document sharing, or other real-time and interactive collaboration methods. A method for creating a "conference call" begins with a conference host accessing the conferencing system with the intent to schedule a conference bridge for use at a specified time. The host schedules the "call" using the conferencing system's scheduling features and then sends invitations to the people who are requested, or required, to join as conference participants. The content of these invitations contains the full context for the conference. For example, invited participants are presented the date and time of the conference, the list of invited participants to the conference, and finally, the "call-in" information for the conference.

The "call-in" information generally consists of a public switched telephone network (PSTN) phone number and a "conference pass-code" (e.g., a "personal identification number" (PIN)), usually in the form of a multi-digit number. The public switched telephone network (PSTN) phone number and PIN number uniquely identify the conferencing system and which of the audio bridges, active on the system, the participant intends to join for their scheduled conference call. Generally, the invitations are sent to participants using electronic mail clients such as Microsoft® Outlook®. Outlook and other email/calendar clients may send formatted emails that allow the receivers of the invitation to easily recognize that they are being invited to attend a conference call and add the meeting invitation to their electronic calendars. The PSTN and PIN call-in numbers are generally included as part of the text fields in the invitation so the information can be found and used by the invitee when it is time to "call-in."

Although the above systems and methods for joining a conference call are effective, they are also inefficient and prone to error. The conference host may mistype the PSTN number and/or pass-code when sending the invitation. Or, the conference participant may not have access to their calendar to retrieve the PSTN call-in number and/or PIN when the conference is scheduled to start. In both of these situations, the result is loss of time and productivity as participants try to join a conference bridge.

Some recently developed and more advanced conferencing systems have attempted to address this problem by having an active connection to the calendars of the people who might be participants on a conference call. Participants who have such an active connection between their calendar and the conferencing system are able to initiate a call-in to a standard PSTN number for the conferencing system. The conference system may join them to the correct bridge at the time listed in the calendar entry. Identification of the person by the conference system is done using the incoming caller ID and/or personal PIN code. Using that information the conferencing system can access that person's calendar; read the information in the calendar entry associated as taking place at the time of the call; identify the conference bridge to join the person to; and, join the person to the correct bridge. The core problem with calendar-based systems is they require the conference bridge to have full, real-time access to the calendars of everyone who might want to use the system in this manner. Another known solution is to have the conference bridge call the participants instead of the other way around. Problems with these approaches include that the conference bridge has to know how to contact the participants (including alternate phone numbers) and how to deal with outbound calls that are unanswered, go to answering machines, or are otherwise answered by anyone other than the intended participant.

In other systems, the conferencing system is provided with a list of expected participants including the participants' caller ID and/or personal PIN, with the date and time that the conference is scheduled, and with instructions to join the participants to the scheduled conference based on their caller ID or personal PIN. The problem with this approach is it does not work for "ad-hoc" conferencing situations where users are assigned personal conference codes and are then free to start conferences whenever they would like (subject to capacity limits on the bridge).

SUMMARY

It is with respect to the above issues and other problems that the embodiments presented herein were contemplated. Herein, systems and methods provide an identity to a conference bridge; the identity including an email address for the conference bridge. When two or more people desire to conduct a conference, a person creates an invitation to the conference. The invitation can be an email invitation from a calendar program that can be sent to the invitees. The invitation can be sent to the conference bridge using the email address for the conference bridge. The conference bridge may then receive a call from a caller for a conference. The conference bridge can extract a caller identifier from the call and determine an email address associated with the caller. The conference bridge may then retrieve the invitation having the caller's email address. Then, the conference bridge can attach the caller to the conference associated with the invitation.

The idea proposed to solve the problems outlined above is to implement a novel system and/or method that treats the conference bridge as an invitee or participant in a scheduled calendar meeting as defined by the enterprise's calendar system (e.g., Outlook, Lotus, etc). In order to realize the benefits to be gained by such an assignation, every independent conferencing system can be assigned its own fully qualified enterprise email address. During the process of scheduling a meeting, the meeting invitation can be sent to the email address for the conferencing system (i.e., "invite" the conference bridge). The invitation may in many implementations include variable data representing the call-in information. This call-in information can be contained in some parse-able or accessible portion of the invitation received by the conferencing system.

Using this method, the invited conferencing system may have a list of the email addresses corresponding to the attendees invited to call into the conference (e.g., the invitee list). At conference start time, embodiments of the invention can, upon receiving an incoming call to the general conferencing system number, map the incoming automatic number identification (ANI) of the caller to an email address (i.e., via a directory lookup, for example by querying an enterprise lightweight directory access protocol (LDAP) directory). If a match is found, the conferencing system can then scan the list of invites to conferences that are about to start, or are already active, to see if the email address is associated with one of the invitees expected to be in a conference. If a matching invite is found on the conference invitation and if the conference bridge can parse the "location and/or identity" of the meeting invite that says what the call-in information is for the meeting, then the conference bridge can simply play out a "verification of ID message" such as, "Hello <Rick Block.> Press 1 to join your scheduled conference <Conference Name>. Press 2 to enter a PIN number manually." and then add the caller into the right conference. Note that this method is possible even in cases where the invitee didn't actually formally click an "accept" on the email for the meeting.

When using this method and system, the conference bridge may not, in most "inside the enterprise" cases, need to have users administered. Within an enterprise, the conference bridge can get very reliable ANI information for everyone in the enterprise and may have access to an enterprise directory that can map an ANI to an email address. So the embodiments can work very reliably for every user in the enterprise. If the enterprise directory is augmented with employees' cell phone numbers, the correct conference can be reliably determined for employees calling from either their desk phone or their cell phone.

In alternative embodiments, the specific conference information may be inferred based on the originator's email address. With this mechanism the conference codes and/or PINs could be hidden. For example, within an enterprise, some people have their own "ad-hoc" conference codes meaning they are administered on the conference bridge as users and can start conferences any time they would like using their assigned conference codes. If people calling into the conference can be mapped to their email address (for example, by the ANI), the originator could simply say in the invite "my bridge." Then, when people call into the main conference bridge number, the embodiments can resolve an email address from the ANI, find the appropriate invitation for that caller, and put the caller into the conference associated with the originator based on the email address of the originator of the invitation. However, in an embodiment, the system may provide for non-enterprise LDAP users to be sent a general invitation to enter their ANI information into a special LDAP database so that they can call into the conferencing system and be identified by one or more of their non-enterprise ANI's and have that be resolved automatically to one or more of their non-enterprise email addresses. Another possible way to determine the correct conference for non-enterprise callers can be for the conference bridge to prompt the outside callers to enter their email address using dual tone multi-frequency (DTMF) entry of alphabetic characters (using any well-known technique for converting DTMF to ASCII characters) or using speech recognition technology. The conference bridge could optionally store previously entered associations of caller IDs and email addresses for subsequent reuse, i.e. the incoming caller ID and the entered email address can be entered in the system database as a pair of data linked to a specific caller. Note that, in this scenario, the originator of the meeting invitation can have to copy the conference bridge email address on the invitation.

Embodiments of this system and/or method could also handle situations in which a caller has been invited to multiple, distinct conference calls at the exact same time or overlapping conference calls. In these cases, the system can present the caller a menu of choices asking which conference they want to participate in. An extended feature also possible in this novel system and method can be to have the system join the caller into both conference bridges at the same time from a single line. Then, via DTMF controls, or perhaps web dashboard controls, the caller could switch back and forth between the audio streams of the two calls without dropping from either bridge.

In some cases where a caller into a bridge number cannot be resolved through this system and/or method, the standard "PIN access" number interface can be presented as an option.

An additional novel use of this system and/or method can be possible for meeting scheduling purposes. This embodiment relates to situations where a user wants to schedule a meeting, and bridge for the meeting, but doesn't already have a personal ad hoc conference bridge. Today, in such situations, users either use a conference call scheduler provided as a plug-in to their desktop email client or schedule the conference bridge and the meeting on the calendar system independently from each other. In the latter case these users generally must manually add the conference call information to the calendar invitation or send it later in a meeting update.

Embodiments of systems implementing the proposed idea may have a fully qualified email address and associated calendar access with that email. As such, the embodiments of the proposed invention can treat receipt of an invite without specific conference bridge information as a request to schedule the conference resources and then publicize the call-in details by sending out a reply or an update to the meeting invite using the enterprise calendaring system. Because the conference bridge has a fully qualified "email identity" with respect to the calendaring system, this transmission of invites may be possible. Invitees can see an initial invite without bridge information coming from the meeting host and then an update with bridge information from the audio conferencing system. To send a meeting update (as opposed to a reply-all with the conference information), the system could use "email spoofing" techniques or privileged email access to send the update to invitees as if it came directly from the conference host's email address.

So embodiments of the process can look something like:

1) User sends a "Meeting Invitation" message, with or without bridge details, to participants and to the conferencing system's email.

2) Conferencing system parses the request for relevant information including the "bridge" field (e.g. "bridge: TBD, MyBridge, etc") and also for the email addresses of the people to be invited to the meeting.

3) If bridge details are not provided, the conferencing system may schedule an audio conference of the appropriate size and send a reply or meeting update including the call-in details to the invitees.

4) The invitees receive the meeting invite from the human person who initiated this invitation, and possibly a subsequent reply or update with the call-in details.

5) At the date and time indicated in the invite, the invitees call a single number identifying the conferencing system but not a specific conference and are automatically placed into the correct conference.

The embodiments can have a number of advantages. For example, the key advantage of this approach compared to current approaches is it makes calling into meetings and having the call-ins associated to them easier and more reliable both for the conference host and the attendees. Assigning a full enterprise email identity to conferencing systems used by an enterprise enables this capability. The assignment of a fully qualified enterprise email address and phone number (e.g., Enterprise Identity) to audio (or multimedia) conferencing systems allows them to participate fully in the use of the other enterprise systems that require users to have enterprise identity. Examples include email systems and calendar systems and perhaps other enterprise applications (e.g., SAP, HR, Accounting, etc.). As enterprise software systems exhibit ever higher levels of application level intelligence, the assignment of enterprise identities to those systems allows for those systems to interact in a more natural human, and therefore productive, way with the human users of the enterprise software systems.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or, operation done without material human input when the process or operation is performed. However, a process or operation can be automatic, even though performance of the process or operation uses material or immaterial human input, if the input is received before performance of the process or operation. Human input is deemed to be material if such input influences how the process or operation may be performed. Human input that consents to the performance of the process or operation is not deemed to be "material."

The term "computer-readable medium" as used herein refers to any tangible storage that participate in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it can be appreciated that the individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description may provide those skilled in the art with an enabling description for implementing the embodiments. It being understood that various changes may be made in the function and arrangement of elements without departing from the spirit and scope of the invention as set forth in the appended claims.

Figure 1:
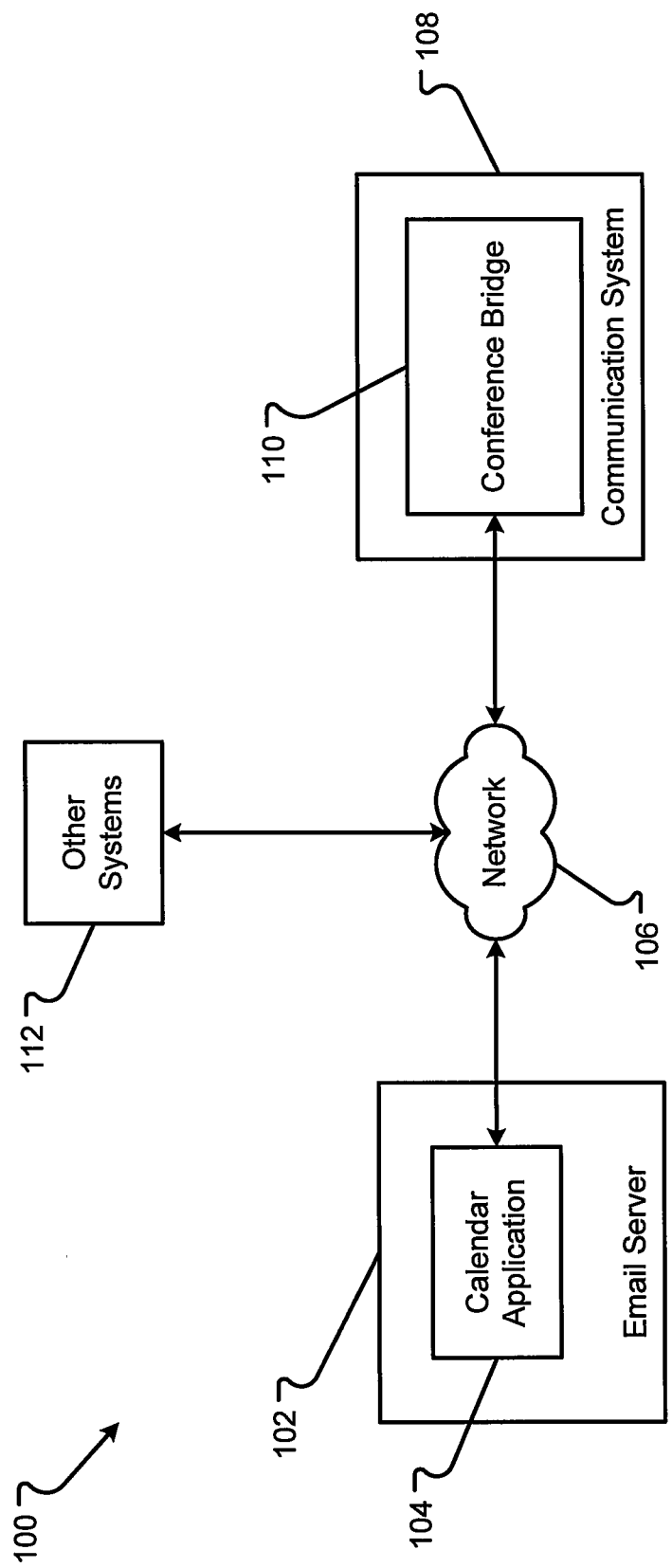
FIG. 1 is a block diagram of an embodiment of a system for scheduling and conducting a conference on a conference bridge.

An embodiment of a system 100 operable to join at least two callers (e.g., the originator 114 with the calendar user interface 118 and the participant 116 with the calendar user interface 120) into a conference is shown in FIG. 1. The several components of the system 100 may be hardware, software, or a combination of hardware and software. Descriptions of the computer system environment and the computer systems which may embody the several components of system 100 are described in conjunction with FIGS. 6 and 7. However, it can be noted that the software applications of one or more of the computing systems may be embodied in specially designed hardware, for example, an application specific integrated circuit (ASIC), a field programmable gate array (FPGA), etc.

In embodiments, a communications server 102 can execute a calendar application 104. The communications server 102 can be an email server or other type of system that can send or receive invitations for conferences. Hereinafter, the communications server 102 may be referred to as an email server 102 but the system 100 is not limited to this embodiment. The email server 102 may include one or more of the components described in FIGS. 6 and 7. In embodiments, the email server 102 may be geographically separated from the user or the communication system 108 and operate for an entire entity. The calendar application 104 is any software package, which may execute on a server and/or a user computer, operable to schedule events, such as conference calls, and operable to send and/or receive invitations to scheduled events. Examples of the email server can be Microsoft® Exchange®, while an example of the calendar program can be Microsoft® Outlook®.

The calendar application 104 can generate a conference call event from user inputs. Then, the calendar application 104 may invite two or more attendees. The created invitation(s) can be sent by the email server 102 through a network 106 to one or more invitees. One of the invitees may be a conference bridge 110 that is part of a communication system 108. Thus, the conference bridge 110 can have an identity within the enterprise that includes an email or other communication address to receive invitations.

The communication system 108 can be any hardware, software, networks, or other components or systems used in enterprise communications. For example, the communication system 108 may be Meeting Exchange® or Meeting Exchange® Express offered by Avaya® Inc. The communication system 108 includes a conference bridge 110. The conference bridge 110 is a system that allows conferencing between two or more parties. For example, the conference bridge 110 can establish a conference call between a first party, which can be a communication endpoint, and a second party, which can be a second communication endpoint. In embodiments, the conference bridge 110 can receive a call from a caller for a conference. The caller may be identified by a telephony identifier, for example, a session initiation protocol (SIP) identifier or a caller identification (caller ID). In embodiments, the conference bridge 110 also offers a set of commands or functions that allow the parties to manage the conference call. The conference can be audio, video, or a combination of multimedia communications.

In embodiments, when the email server 102 acts to invite attendees into the conference call, an invitation is sent to the conference bridge 110. The conference bridge 110 does not necessarily schedule the conference but receives and stores the invitation. At a later time, the conference bridge 110 can retrieve information in the invitation to determine the attendees to the conference and attach those attendees to the conference. Further description of the components and operations of the email server 102 are described in conjunction with FIG. 2A.

Other systems 112 may also be operable to schedule conferences. The other systems 112 can schedule conferences and send invitations both to the attendees and to the conference bridge 110. The other systems 112 can include social networking sites, external conferencing systems, third party meeting websites, etc. The email server 102, other systems 112, and/or communication system 108 can communicate through a network 106. The network 106 can include any system, method, or protocol for communicating data; exemplary embodiments of the network 106 are described in conjunction with FIGS. 6 and 7.

Figure 2A:
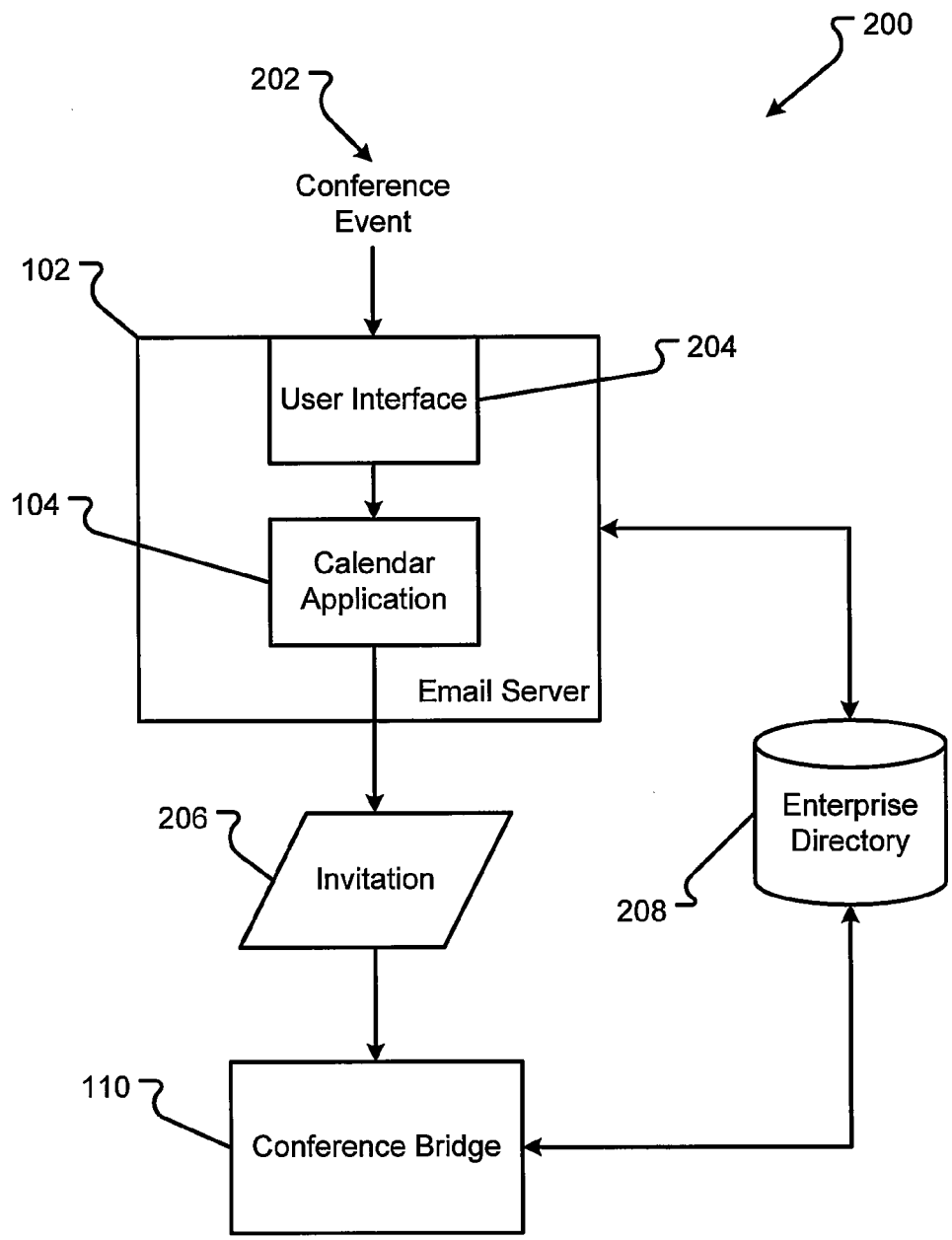
FIG. 2A is a block diagram of an embodiment of an email server and conference bridge operable to schedule a conference on the conference bridge.

An embodiment of the email server 102 and system 200 for communicating invitations is shown in FIG. 2A. The email server 102 may function as software and/or hardware modules, as described in conjunction with FIGS. 6 & 7. A functional description is provided hereinafter. A user interface 204 allows the email server 102 to interact and communicate with the one or more users. The user interface 204 can be as described in conjunction with FIG. 7. In embodiments, the user interface 204 receives a conference event 202 from a user. A conference event 202 can be an input that schedules a conference call. The user interface 204 allows the calendar application 104 to accept information about the conference and to create the invitation(s) 206 that is sent to the conference bridge.

In embodiments, the email server 102 and/or conference bridge 110 have access to an enterprise directory database 208, also referred to as an enterprise directory 208. The enterprise directory database 208 can be any database stored in a memory as described in conjunction with FIGS. 6 and 7. The enterprise directory database 208 can store information about people or entities associated with an enterprise. In embodiments, the conference bridge 110 is provided an identity in the enterprise directory database 208. The identity can include a telephony identifier and other information, such as an email address for the conference bridge 110. Further, the enterprise directory 208 can store information about a caller and provide information, such as the caller's email address based on the telephony identifier.

In embodiments, the email server 102 and/or conference bridge 110 have access to an external users database 218, similar to the enterprise directory 208. The external users database 218 can be any database stored in a memory as described in conjunction with FIGS. 6 and 7. The external users database 218 can store information about people or entities not associated with an enterprise. The identity for the external uses can include a telephony identifier and other information, such as an email address. Thus, the external users database 218 can store information about a caller that is outside and/or not associated with the enterprise and provide information, such as the caller's email address, based on the telephony identifier.

Figure 2B:
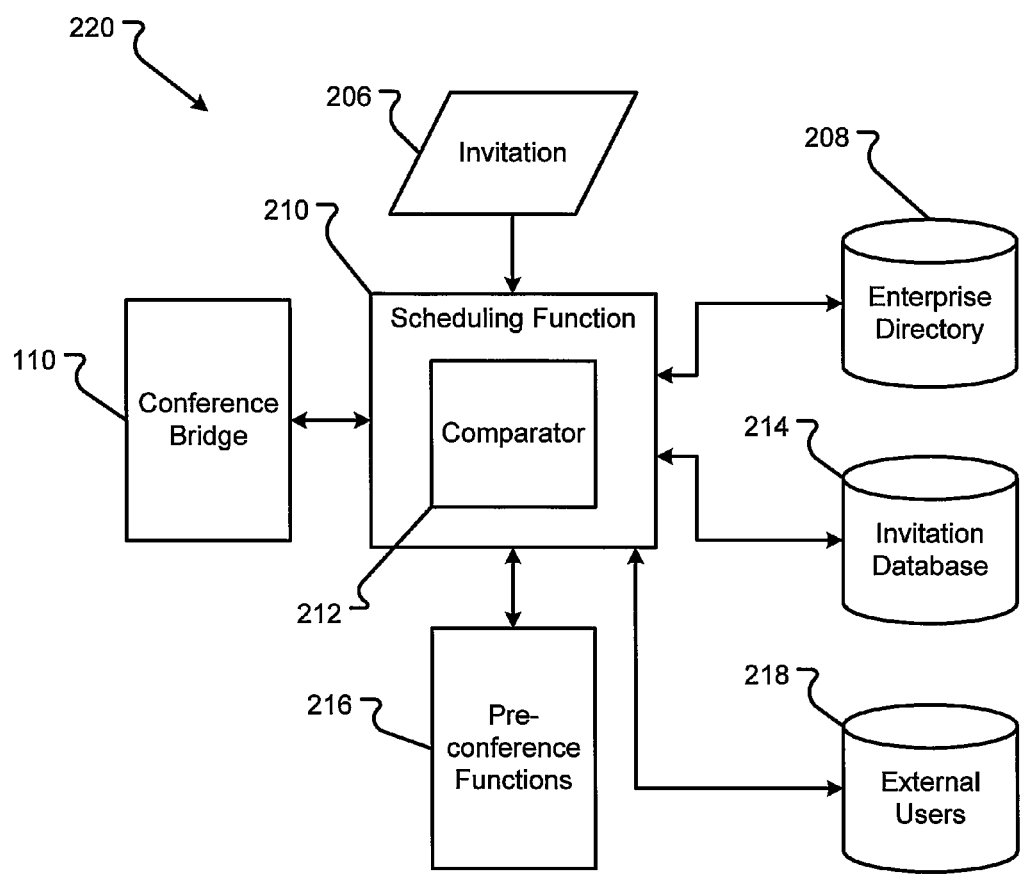
FIG. 2B is a block diagram of an embodiment of a conference bridge operable to conduct a conference.

An embodiment of the conference bridge 110 and communication system 220 for scheduling conferences based on a received invitation is shown in FIG. 2B. The communication system 220 and/or the conference bridge 110 may function as software and/or hardware modules, as described in conjunction with FIGS. 6 & 7. A functional description is provided hereinafter. A scheduling function 210 can execute on a conference bridge 110 or as a separate, stand-alone component. The scheduling function 210 is operable to receive invitations 206 from an email server 102 or other system. The scheduling function 210 can then complete actions to schedule or conduct conferences on the conference bridge 110. A scheduling function 210 may also receive information from a conference bridge 110 associated with a call to the conference bridge 110. With the received information, the scheduling function 210 may determine the specific conference associated with the received call and pass the information to the conference bridge 110.

The scheduling function 210 may execute a comparator 212. The comparator 212 can be a software or hardware component. The comparator 212 is operable to search for information received from invitations or calls with data stored in one or more databases. The databases may include one or more of, but are not limited to, the enterprise directory 208, an invitation database 214, and an external users database 218. Any of these databases can be a database stored in a memory as described in conjunction with FIGS. 6 and 7. The invitation database 214 is operable to store invitations 206 or provide the stored invitations 206 or information about the stored invitations 206. The external user database 218 can store the same or similar information as the enterprise directory 208. For example, the external user database 218 can store telephony identifiers, email addresses, and other information associated with persons that are not part of the enterprise and, thus, are not included in the enterprise directory 208.

The communication system 220 can also include one or more pre-conference functions 216. A pre-conference function 216 can be a computer module that performs an activity. Those activities can be functions required to schedule conferences or activities related to scheduling conferences. For example, the preconference functions may include a capacity check, a conference scheduling function, and an authorization check. A capacity check can determine if there is enough bandwidth on the conference bridge 110 for a conference, associated with an invitation 206, to be held. A conference scheduling function may schedule bandwidth on the conference bridge 110 for a conference, associated with an invitation 206, to be held. The conference scheduling function may not execute as a conference need not be scheduled. A conference can be created when callers begin to call in for a conference and are associated with an invitation 206. Thus, the invitation 206 can guide the conference bridge 110 on how to attach callers to conferences. Finally, an authorization check may check the credentials of a user that sends the invitation 206 to determine if the user is authorized to schedule and/or establish a conference.

Figure 3A:
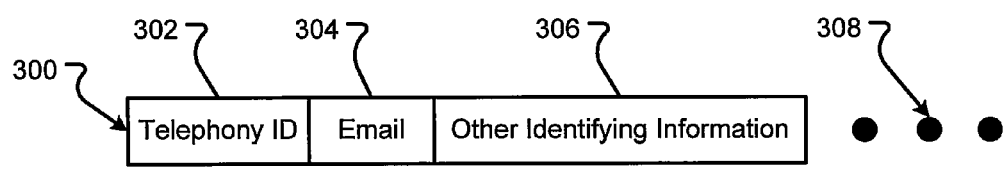
FIGS. 3A & 3B are block diagrams of embodiments of data structures that are stored, sent, or received by one or more computer systems when scheduling or conducting a conference on a conference bridge.
Figure 3B:
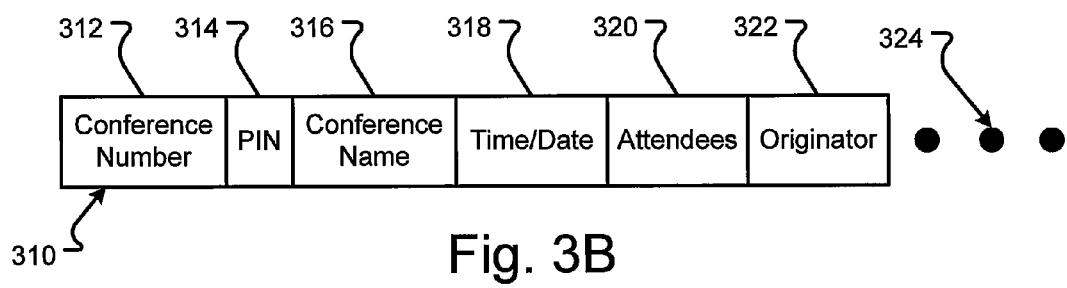

Embodiments of data structures containing information stored, received, or sent with the systems and components as described in FIGS. 1-2B are shown in FIGS. 3A & 3B. A data structure 300 embodying at least a portion of the data stored in an enterprise directory 208 or in an external user database 218 is shown in FIG. 3A. While the data structure 300 is shown with three data fields, it can be understood that the data structure 300 may have more or fewer data fields than those shown in FIG. 3A, as represented by ellipses 308. Embodiments of the data structure 300 can include a telephony identifier (ID) field 302, an email address field 304, and/or other identifying information field(s) 306.

The telephony identifier (ID) field 302 includes at least one or more identifiers for one or more communication devices. The identifier can include an identification of the business telephone, cellular telephone, home telephone, pager, or other communication device associated with a user. In embodiments, the telephony identifier (ID) field 302 is a globally unique identifier (GUID), a SIP ID, a caller ID, or other ID.

The email address field 304 includes one or more email or communication addresses associated with a user. The email addresses could include the user's work email address and one or more of the user's personal email addresses. The other identifying information field(s) 306 can include other information that is associated with or identifies the user. This information can include the user's name, the user's address, the user's employee number, the user's social security number, etc.

The conference invitation data structure 310, as shown in FIG. 3B, includes one or more fields for storing data associated with an invitation 206. A conference invitation data structure 310 includes the one or more fields required for the conference bridge 110 to begin a conference call or attach one or more other parties to a conference. The parties can be identified with phone numbers or other identifiers provided in the conference invitation data structure 310. The conference invitation data structure 310 includes one or more items of information required to determine which conference to which a caller desires attachment.

The conference invitation data structure 310 includes a conference number field 312, a personal identification (PIN) field 314, a conference name field 316, a time and/or date field 318, an attendees field 320, and/or an originator field 322. While the conference invitation data structure 310 is shown with six data fields, it can be understood that the conference invitation data structure 310 may have more or fewer data fields than those shown in FIG. 3B, as represented by ellipses 324. The conference number 312 and PIN 314 may be optional. If the scheduling function 210 creates a conference number 312 and PIN 314, the scheduling function 210 can store the conference number 312 and PIN 314. A conference number 312 can be a phone number or other identifier (for example, a SIP universal resource locator (URL)) that callers may use to call the conference bridge 110 for the conference. The personal identification number 314 is an identifier that one or more callers may provide the conference bridge 110 to identify the specific conference to which the caller wants to be attached. In embodiments, the conference invitation data structure 310 may include two or more PINs 314 that are each associated with a particular caller. Thus, each caller can identify the conference by providing their PIN 314 to the conference bridge 110.

A conference name 316 may also identify the conference. The conference name 316 may be provided by the conference originator or automatically by the scheduling function 210. A caller may provide the conference name 316 to identify the conference to which the conference bridge 110 is to attach them. The time and/or date field 318 can store the time or date of the conference as entered in the invitation. To better define the conference to which a caller is requesting, the scheduling function 210 can retrieve the time and/or date 318. Then, the scheduling function 210 can compare the date or time of the call to the time and/or date 318 to better associate the call with the conference.

An attendees field 320 includes one or more names or other identifiers for the invitees or attendees of the conference. The attendees 320 are the people invited to the conference. In an embodiment, the attendees field 320 includes the email addresses of the attendees. Similarly, an originator field 322 can include the name or identifier of the person that created the invitation to the conference. The originator field 322 can also include the email address of the originator.

Figure 4A:
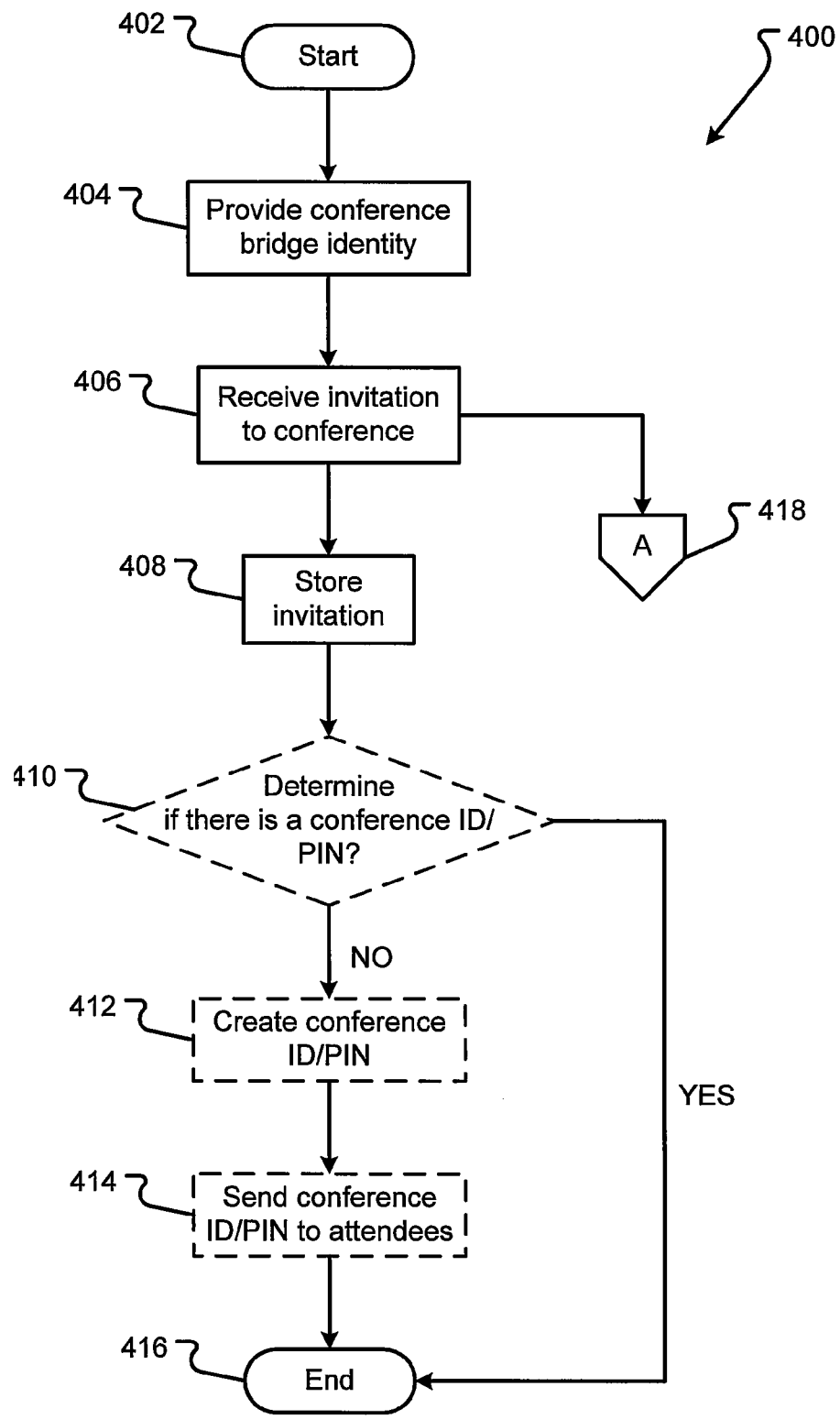
FIGS. 4A & 4B is a flow diagram of an embodiment of a process for scheduling a conference on a conference bridge.
Figure 4B:
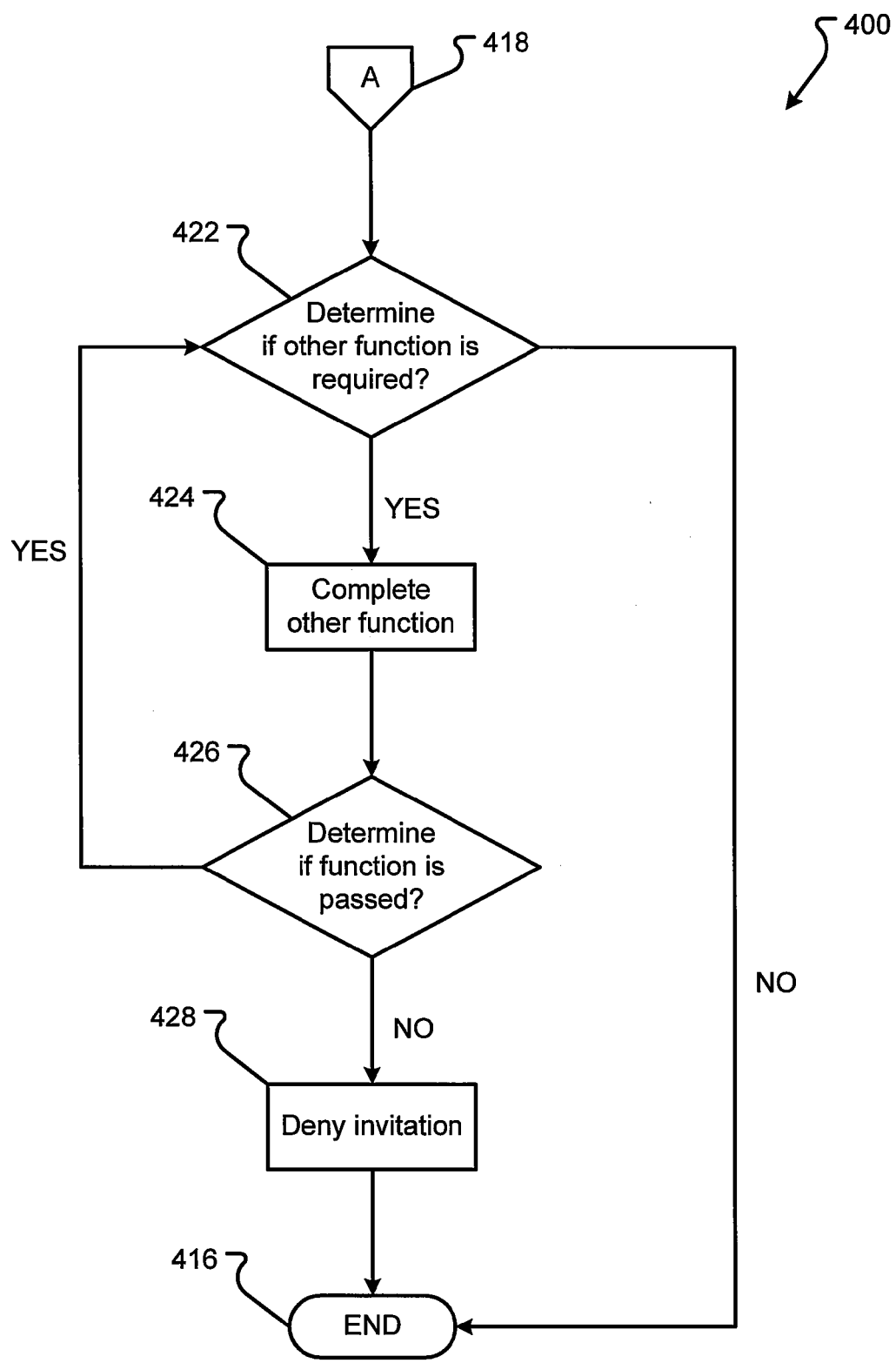

An embodiment of a method 400 for scheduling a conference call is shown in FIGS. 4A & 4B. Generally, the method 400 begins with a start operation 402 and terminates with an end operation 416. While a general order for the steps of the method 400 are shown in FIGS. 4A & 4B, the method 400 can include more or fewer steps or arrange the order of the steps differently than those shown in FIGS. 4A & 4B. The method 400 can be executed as a set of computer-executable instructions executed by a computer system and encoded or stored on a computer readable medium. Hereinafter, the method 400 shall be explained with reference to the systems, components, modules, data structures, etc. described in conjunction with FIGS. 1-3B.

The enterprise provides an identity for the conference bridge 110 and stores the identity in the enterprise directory 208 in step 404. Thus, the enterprise can store one or more portions of the identity 300 as described in conjunction with FIG. 3A. In embodiments, the enterprise directory 208 can store an identifier 306 and an email address 304. Users in the enterprise can then email invitations to the conference bridge 110.

At some time after creating an identity for the conference bridge 110, the conference bridge 110 receives an invitation 206 to a conference in step 406. In embodiments, the invitation 206 is received by the scheduling function 210. The process 400 can then flow through connector 418 to FIG. 4B. The scheduling function 210 can also store the invitation 206 as a data structure 310 in the invitation database 214 in step 408. In this way, the invitation 310 can be retrieved or queried at a later time to determine the conference in which a caller is interested.

One or more optional operations may then be conducted by the scheduling function 210 or pre-conferencing functions 216. The scheduling function 210 can determine if a conference identifier or PIN have been created or provided for the conference in step 410. In embodiments, the scheduling function 210 determines if a user provides a conference identifier or PIN, associated with the user, in the invitation 206. A user may have a permanent conference identifier or PIN assigned to the user. The user may be able to schedule conferences with the assigned identifier or PIN. If there is a conference identifier or PIN, the process 400 flows YES to end 416. If there is no conference identifier or PIN, the process 400 can flow NO to step 412.

If there is no conference ID or PIN, the scheduling function 210 creates the conference ID and/or the PIN in step 412. The scheduling function 210 can then store the conference ID and/or the PIN in the fields 312 and/or 314 of the invitation data structure 310. The scheduling function 210 may then send the conference ID and PIN to the attendees in step 414. In embodiments, the scheduling function 210 generates an email to each attendee using the email addresses included in the invitation 206 or completes a reply function to the invitation 206. In another embodiment, the scheduling function 210 generates another type of communication, such as an instant message or voice mail, which is sent to the attendees. The communication includes the created conference identifier and/or PIN.

The process 400 flows through connector 418 to step 422. The scheduling function 210 may determine if another function is required in step 422. In embodiments, the scheduling function 210 determines if a pre-conference function 216 is active or needs to operate on the invitation 206. The determination may be made by determining the pre-conference functions 216 that are active and executing. In other embodiments, the pre-conference functions 216 register with the scheduling function 210 to receive the invitation 206. If another function is required, the process 400 flows YES to step 424. If another function is not required, the process 400 flows NO to end 416.

The one or more pre-conference functions 216 complete in step 424. The pre-conference functions 216 can include at least one of, but are not limited to, a capacity check, a conference scheduling function, and an authorization check. The capacity check function can check if the conference bridge 110 has enough bandwidth to conduct the conference at the time and date in the invitation 206. The capacity check searches the invitation database 214 for the time and/or date 318 of the conference. The capacity check then searches the capacity requirements for the conference bridge 110 at the time and date. If the capacity is adequate for the new conference, the capacity check passes.

A conference scheduling function can schedule the conference with the conference bridge 110. It is not necessary to schedule the conference because the invitation database 214 includes the information for the conference. However, to better check and plan the conferences, the conference scheduling function 210 can schedule the conferences associated with the invitations 206 and store the scheduled conferences in another database. If the conference is scheduled, the conference function passes. However, if the conference cannot be scheduled, the function fails. The authorization check can determine if the originator of the conference is authorized to create the conference. The authorization check can search the originator field 322 for the identity of the originator. Then, the authorization check can check the enterprise directory 208 for the credentials associated with the originator's identity. If the credentials allow for scheduling a conference, the authorization check passes.

The scheduling function 210 determines if the pre-conference functions 216 passed in step 426. If the pre-conference functions 216 are passed, as described above, the process 400 flows YES back to step 422. If one or more of the functions do not pass, the process 400 flows NO to step 428. In step 428, the scheduling function 210 denies the invitation 206. In embodiments, the scheduling function 210 completes a denial function associated with the invitation 206, similar to a user selecting a denial button on an online invitation. In other embodiments, the scheduling function 210 sends the denial to one or more of the attendees, such as the originator.

Figure 5A:
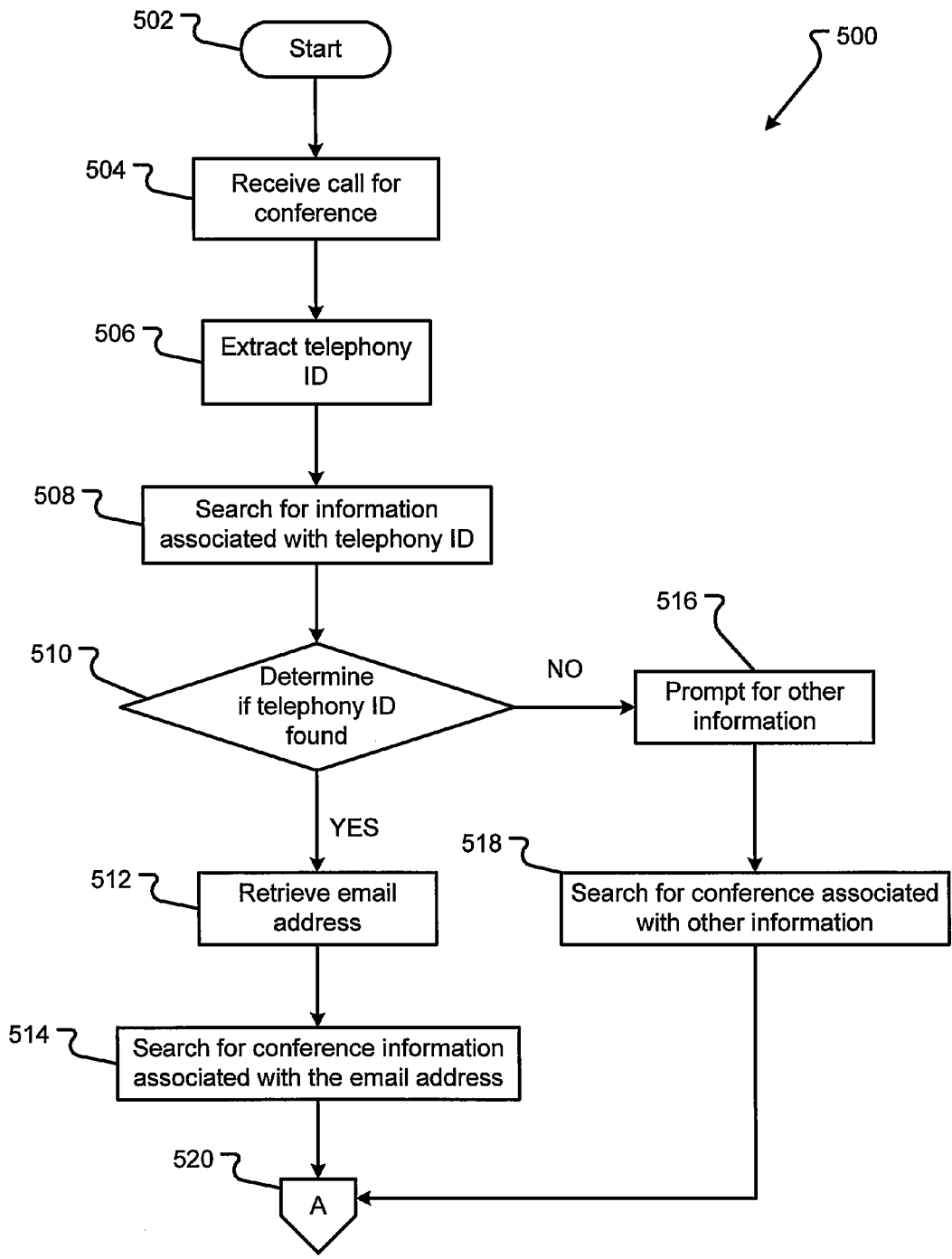
FIGS. 5A & 5B is a flow diagram of an embodiment of a process for conducting a conference on a conference bridge.
Figure 5B:
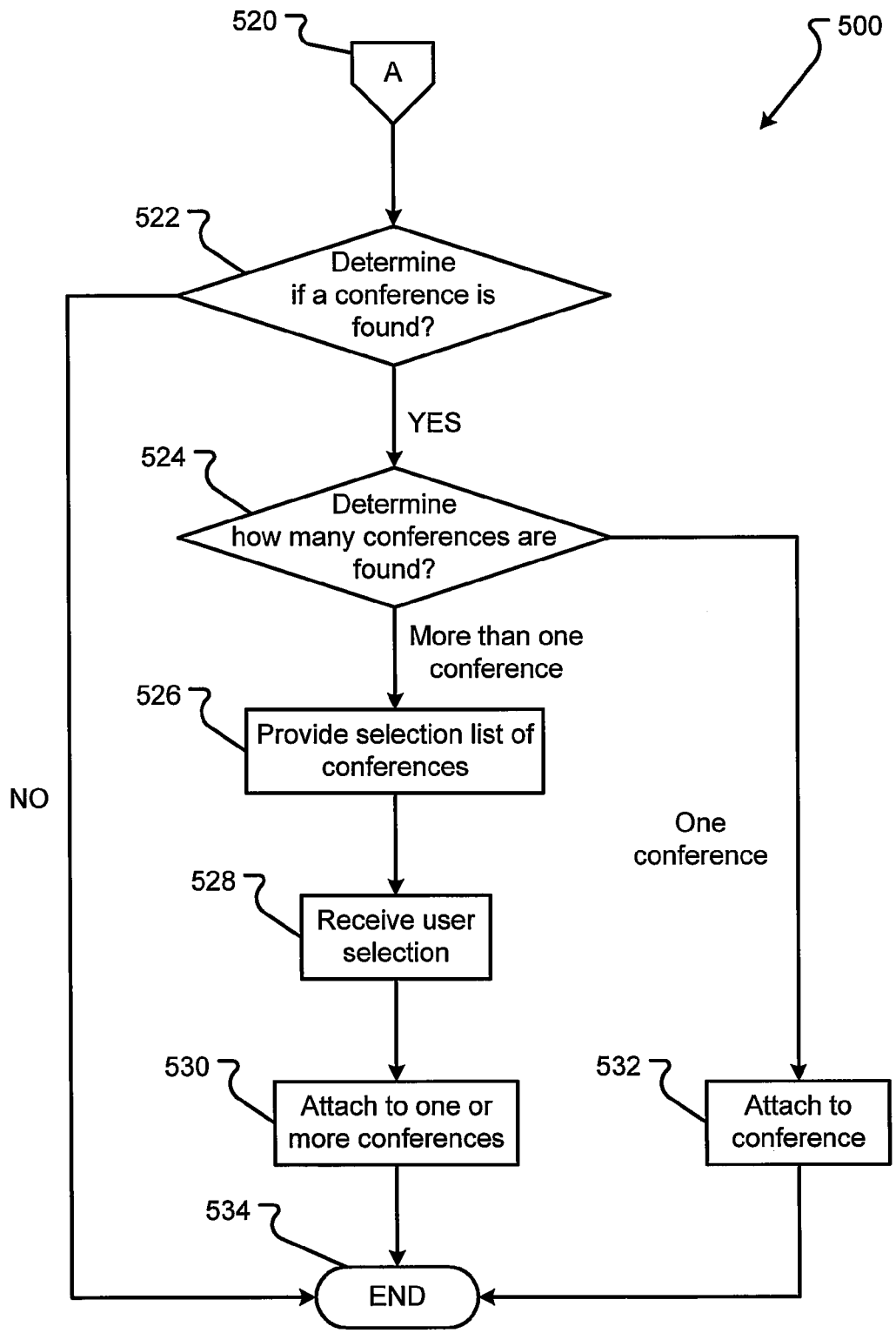

An embodiment of a method 500 for conducting a conference call on a conference bridge 110 is shown in FIGS. 5A & 5B. Generally, the method 500 begins with a start operation 502 and terminates with an end operation 534. While a general order for the steps of the method 500 are shown in FIGS. 5A & 5B, the method 500 can include more or fewer steps or arrange the order of the steps differently than those shown in FIGS. 5A & 5B. The method 500 can be executed as a set of computer-executable instructions executed by a computer system and encoded or stored on a computer readable medium. Hereinafter, the method 500 shall be explained with reference to the systems, components, modules, data structures, etc. described in conjunction with FIGS. 1-3B.

The conference bridge 110 receives a call for a conference in step 504. The call may be to a general number for the conference bridge 110 or to a number associated with the conference. The call includes information associated with the caller incorporated within the data for the call. The conference bridge 110 extracts the telephony identifier from the call information in step 506. In step 508, the conference bridge 110 can then send the telephony identifier to the scheduling function 210. A comparator 212 can search the enterprise directory 208 and/or the external users database 218 for the telephony identifier. The comparator 212 compares the telephony identifier to the telephony identifiers 302 in the enterprise directory 208 and/or the external users database 218. The comparator 212 then determines if the telephony identifier is found in the enterprise directory 208 and/or the external users database 218 in step 510. If the telephony identifier is found, the process 500 flows YES to step 512. If the telephony identifier is not found, the method 500 flows NO to step 516.

The scheduling function 210 then retrieves the email address from the enterprise directory 208 and/or the external users database 218 that is associated with the telephony identifier in step 512. In some embodiments, there may be no email address associated with the telephony identifier. In these situations, the method 500 may flow to step 516. Then, the scheduling function 210 searches the conference information in the invitation database 206 for the email address in step 514. In embodiments, the scheduling function 210 searches the attendees 320 field of one or more conferences 310 in the invitation database 214.

If there is no telephony identifier found, the scheduling function 210 can prompt the caller for other information in step 516. The information can include information that allows the scheduling function 210 to determine the caller's identity and, thus, find the caller's email. In embodiments, the scheduling function 210 prompts the caller with voice prompts that can be responded to by DTMF signals. In other embodiments, the scheduling function 210 may send an email or other electronic signals to a computer associated with the caller. The prompts or electronic signals ask for other information that can be used by the scheduling function 210 to find the conference for which the caller is interested. The telephone prompts and/or electronic signals can be responded to by the caller and read by the scheduling function 210. The scheduling function 210 may then use the information provided to search the invitation database 214 for the conference requested in step 518. The process 500 can then flow through connector 520 to FIG. 5B.

The scheduling function 210 can determine if the conference is found in step 522. The scheduling function 210 determines if the email address or other information from steps 514 or 518 is in the invitation database 214. If the information is found, and thus, a conference is found, the method 500 flows YES to step 524. If the information is not found, and thus, a conference is not found, the method 500 flows NO to end 534. The scheduling function 210 may then determine if more than one conference are found. In some embodiments, a caller may be scheduled for more than one conference at the same time or at overlapping times. If one conference is found, the method 500 flows along the "ONE CONFERENCE" branch to step 532. If more than one conference is found, the method 500 flows along the "MORE THAN ONE CONFERENCE" branch to step 526.

The scheduling function 210 can then provide conference information to the conference bridge 110 to attach the caller to a conference or begin a conference in step 532. The conference bridge 110 then conducts the conference using known methods. If there is more than one conference, the scheduling function 210 can provide the list of the two or more conferences to the caller in step 526. The scheduling function 210 prompts the caller with voice prompts that can be responded to by DMTF signals. In other embodiments, the scheduling function 210 may send an email or other electronic signals to a computer associated with the caller. The prompts allow the caller to choose which conference the caller wants to attend. The scheduling function 210 can receive the selection from the caller in step 528.

Depending on what selections were received, the scheduling function 210 sends information about the conference(s) to the conference bridge 110 to attach the caller to the conference(s) or starting the conference(s). If the caller desires to be attached to two or more conferences, the caller can, during the two or more conferences, switch between the conferences or may be able to hear both conferences and select conferences into which to communicate.

Figure 6:
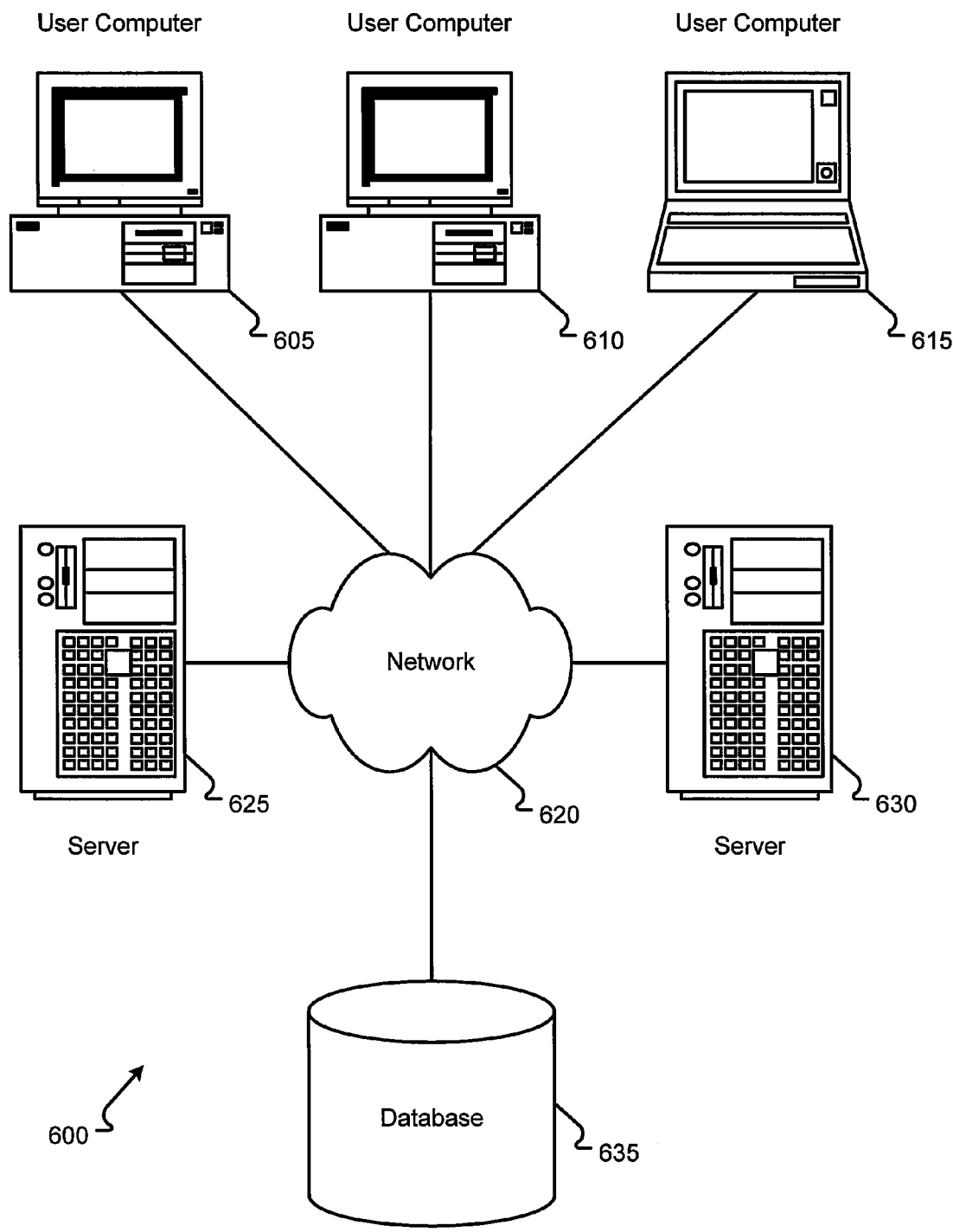
FIG. 6 is a block diagram of an embodiment of a computer system environment in which the systems and methods may be executed.

FIG. 6 illustrates a block diagram of a computing environment 600 that may include the communications server 102, the communications system 108, the other systems 112, or other systems described herein for providing information about broadcast content. The system 600 includes one or more user computers 605, 610, and 615. The user computers 605, 610, and 615 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary system 600 is shown with three user computers, any number of user computers may be supported.

System 600 further includes a network 620. The network 620 may can be any type of network familiar to those skilled in the art that can support data communications using any of a variety of commercially-available protocols, including without limitation TCP/IP, SNA, IPX, AppleTalk, and the like. Merely by way of example, the network 620 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks. The network 620 may be the same or similar to network 214.

The system may also include one or more server computers 625, 630. One server may be a web server 625, which may be used to process requests for web pages or other electronic documents from user computers 605, 610, and 620. The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. g illustrates a separate web server 625 and file/application server 630, those skilled in the art may recognize that the functions described with respect to servers 625, 630 may be performed by a single server and/or a plurality of specialized servers, depending on implementation-specific needs and parameters. The computer systems 605, 610, and 615, file server 625 and/or application server 630 may function as communications server 102, the communications system 108, other systems 112, or other systems described herein.

The system 600 may also include a database 635, which may be the same or similar to database 208, 214, or 218. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands.

Figure 7:
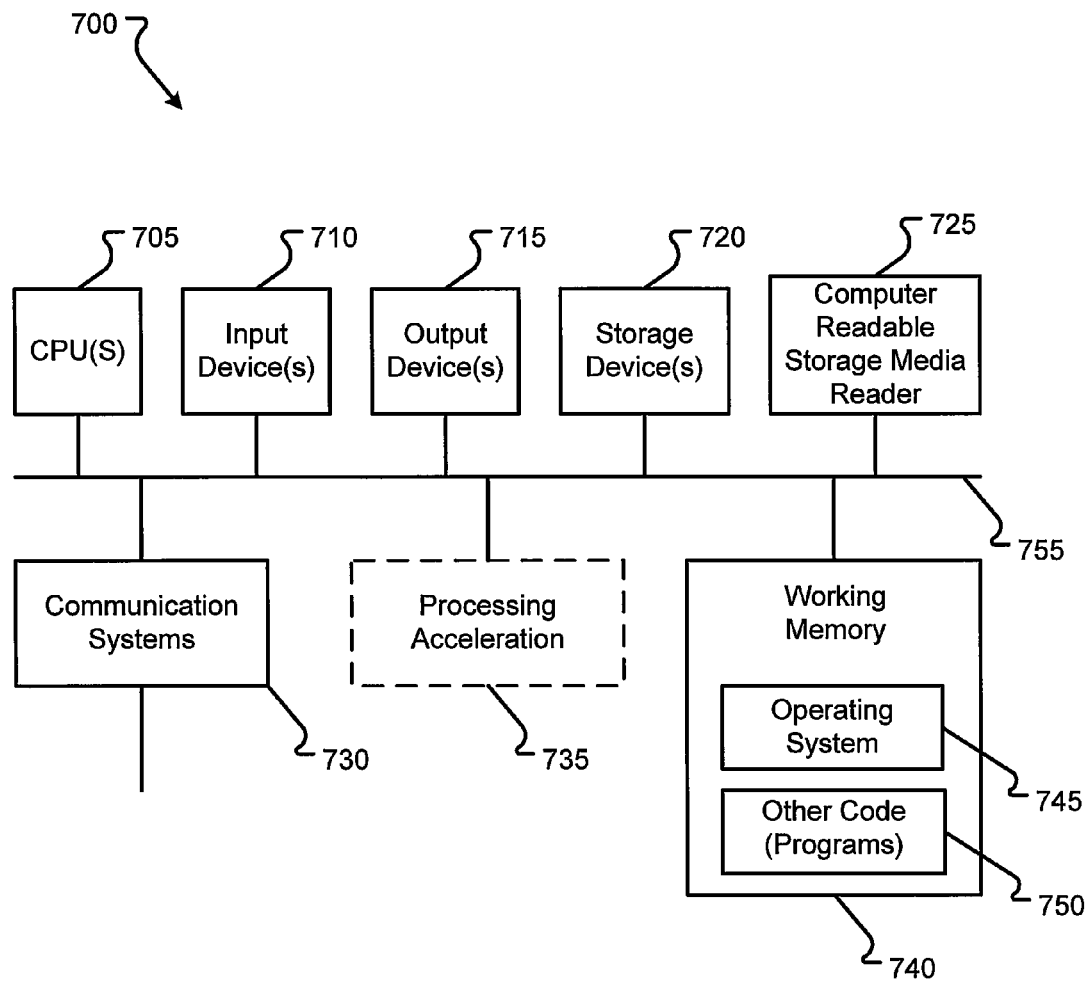
FIG. 7 is a block diagram of a computer system in which the systems and methods may be executed.

FIG. 7 illustrates one embodiment of a computer system 700 upon which the communications server 102, the communications system 108, other systems 112, or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor, and/or the like.

The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750, such as program code implementing the communications system 108. It can be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It can be appreciated that in alternate embodiments, the methods may be performed in a different order than that described. It can also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it may be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer program product including computer executable instructions stored on a non-transitory computer readable medium which, when executed by a processor of a computer, cause the computer to perform a method for scheduling a conference on a conference bridge, comprising:

instructions to receive an invitation to the conference, wherein the invitation to the conference comprises two or more email addresses of invitees to the conference and a bridge field, the invitees comprising first and second invitees;

instructions to parse the invitation to the conference for the two or more email addresses of the invitees of the conference and the bridge field, wherein the bridge field indicates a personal bridge of an originator of the conference and wherein the bridge field is not used to call into the conference;

instructions to send an email about the invitation to the conference to the two or more email addresses of the invitees to the conference;

instructions to receive a phone call from a caller for the conference, wherein the caller is identified by a telephony identifier, and wherein the caller is the first or second invitee of the conference;

instructions to receive the telephony identifier;

instructions to determine an email address associated with the telephony identifier by querying an enterprise directory;

instructions to retrieve the invitation for the conference based on the email address associated with the telephony identifier matching the email address of the first or second invitee; and in response to the email address associated with the telephony identifier matching the email address of the first or second invitee, instructions to attach the first or second invitee to the conference bridge.

2. The computer program product as defined in claim 1, further comprising:

in response to receiving the invitation for the conference, instructions to determine if another function is required;

if another function is required, instructions to complete the other function;

instructions to determine if the other function passed;

if the other function passed, instructions to determine if second function is required; and if the other function does not pass, instructions to deny the invitation for the conference.

3. The computer program product as defined in claim 2, wherein the other function is a capacity check to determine if there is enough bandwidth on the conference bridge.

4. The computer program product as defined in claim 1, further comprising:

instructions to attach the phone call to the conference on a conference bridge, wherein the conference is associated with the invitation for the conference.

5. The computer program product as defined in claim 4, wherein the telephony identifier is one of a SIP identifier or a caller identifier.

6. The computer program product as defined in claim 4, wherein the telephony identifier is associated with a communication address in one of an enterprise directory database and an external email database.

7. The computer program product as defined in claim 4, further comprising:

instructions to determine if the telephony identifier is found;

if the telephony identifier is not found, instructions to prompt caller for other information; and instructions to retrieve the invitation for the conference based on the other information.

8. The computer program product as defined in claim 4, further comprising:

instructions to determine if the invitation for the conference is found; and if the invitation for the conference is not found, instructions to deny the caller attachment to a conference.

9. A communication system comprising:

a conference bridge operable to schedule a conference to conference two or more invitees to the conference, the conference bridge further operable to:

send an email about an invitation to the conference to two or more email addresses of the two or more invitees to the conference, the two or more invitees comprising first and second invitees;

receive a call from a caller for the conference, the caller identified by a telephony identifier;

receive the telephony identifier;

determine an email address associated with the telephony identifier by querying an enterprise directory; and retrieve the invitation for the conference based on the email address associated with the telephony identifier matching an email address associated with the first or second invitee to the conference, wherein the invitation to the conference includes a bridge field, wherein the bridge field indicates a personal bridge of an originator of the conference, and wherein the bridge field is not used to call into the conference.

10. The communication system as defined in claim 9, further comprising the enterprise directory in communication with a scheduling function, the enterprise directory operable to store information about a caller, operable to provide the email address for the caller based on the telephony identifier.

11. The communication system as defined in claim 9, further comprising an external user database in communication with a scheduling function, the external user database operable to store information about an external caller not associated with an enterprise, operable to provide the email address for the external caller based on the telephony identifier.

12. The communication system as defined in claim 9, further comprising a pre-conference functions module in communication with the scheduling function, the pre-conference functions module operable to complete one or more pre-conference functions in response to receiving the invitation, wherein the preconference functions comprise at least one of a capacity check, a conference scheduling function, and an authorization check.

13. The communication system as defined in claim 9, wherein a scheduling function has an identity, wherein the identity is associated with an email address, and wherein the invitation is sent to the email address of the scheduling function.

14. The communication system as defined in claim 13, wherein the identity is stored in the enterprise directory.

15. A method for conducting a conference call, the method comprising:

a scheduling function that receives an invitation to the conference call, wherein the invitation to the conference call comprises two or more email addresses of invitees to the conference call and a bridge field, the invitees comprising first and second invitees;

the scheduling function parsing the invitation to the conference for the two or more email addresses of the invitees of the conference call and the bridge field, wherein the bridge field indicates a personal bridge of an originator of the conference and wherein the bridge field is not used to call into the conference;

the scheduling function sending an email about the invitation to the conference to the two or more email addresses of the invitees to the conference call;

a conference bridge receiving a call from a caller for the conference call, wherein the caller is identified by a telephony identifier, and wherein the caller is the first or second invitee;

the conference bridge extracting the telephony identifier;

the conference bridge searching for an email address associated with the telephony identifier in an enterprise directory;

the conference bridge matching the email address associated with the telephony identifier to the email address of the first or second invitee; and in response to the email address associated with the telephony identifier matching the email address of the first or second invitee, the conference bridge attaching the call to the conference associated with the invitation to the conference call.

16. The method as defined in claim 15, wherein the telephony identifier is one of a SIP identifier or a caller identifier.

17. The method as defined in claim 15, further comprising: the conference bridge determining if the telephony identifier is found; if the telephony identifier is not found, the conference bridge prompting the caller for one of a conference identifier and a personal identification number; and the conference bridge retrieving the invitation associated with the conference based on the conference identifier or the personal identification number.

18. The method as defined in claim 15, further comprising: the conference bridge determining if the invitation is found; and if the invitation is not found, the conference bridge denying the caller attachment to a conference.

19. The computer program product of claim 2, wherein the other function is a conference scheduling function that schedules bandwidth for the conference.

20. The computer program product of claim 1, wherein the bridge field indicates that the conference is to be determined at a later time, wherein the email about the invitation to the conference includes call in details for the conference and is sent from the conference bridge, and wherein the conference bridge sends the email about the invitation to the conference using an email address of the originator of the conference.

* * * * *